United States Patent
S.Ratnam

(10) Patent No.: US 9,126,754 B2
(45) Date of Patent: Sep. 8, 2015

(54) METHOD AND SYSTEM FOR PUSHING AND MOVING SOLID WASTE

(75) Inventor: Sri Skanda Rajah S.Ratnam, Kuala Lumpur (MY)

(73) Assignee: PREMIUM PATENTS SND. BHD, Seri Kembangan (MY)

( * ) Notice: Subject to any disclaimer, the term of this patent is extended or adjusted under 35 U.S.C. 154(b) by 875 days.

(21) Appl. No.: 13/132,320

(22) PCT Filed: Dec. 18, 2008

(86) PCT No.: PCT/MY2008/000189
§ 371 (c)(1),
(2), (4) Date: Aug. 15, 2011

(87) PCT Pub. No.: WO2010/071397
PCT Pub. Date: Jun. 24, 2010

(65) Prior Publication Data
US 2011/0290619 A1  Dec. 1, 2011

(51) Int. Cl.
B65G 53/00 (2006.01)
B65F 1/00 (2006.01)
B65F 5/00 (2006.01)
E04F 17/12 (2006.01)

(52) U.S. Cl.
CPC ............... *B65F 1/0093* (2013.01); *B65F 5/005* (2013.01); *E04F 17/12* (2013.01)

(58) Field of Classification Search
USPC .................................... 406/49, 117, 192, 197
See application file for complete search history.

(56) References Cited

U.S. PATENT DOCUMENTS

| 3,419,209 | A | * | 12/1968 | Munn | 232/1 R |
| 3,730,884 | A | * | 5/1973 | Burns et al. | 406/19 |
| 4,099,457 | A |   | 7/1978 | Hyden |  |
| 4,231,689 | A | * | 11/1980 | Carstens | 406/155 |
| 4,856,941 | A | * | 8/1989 | Morimoto et al. | 406/85 |
| 4,904,127 | A | * | 2/1990 | Morimoto et al. | 406/50 |
| 5,056,962 | A | * | 10/1991 | Morimoto et al. | 406/49 |
| 5,089,297 | A | * | 2/1992 | Koga et al. | 427/238 |
| 5,127,125 | A | * | 7/1992 | Skibowski | 15/104.061 |

(Continued)

FOREIGN PATENT DOCUMENTS

WO       00/46129 A1    8/2000
WO    2007/142508 A1    12/2007

*Primary Examiner* — Joseph Dillon, Jr.
(74) *Attorney, Agent, or Firm* — Maschoff Brennan

(57) ABSTRACT

The present invention relates to a method and system of using at least one moving means (22) for the pushing and moving solid waste (20) from at least one holding area (10) within buildings or outdoors through a waste transport conduit (14) to at least one collection station (28) or at least one collection conduit (26). The movement of the at least one moving means (22) is driven by generating differential pressure across the at least one moving means (22) to push and move the solid waste (20) towards the at least one collection station (28) or at least one collection conduit (26). The differential pressure creates systematic directional air movement inside the waste transport conduit (14) to move the at least one moving means (22) to move and push the solid waste (20) to the at least one collection station (28) or at least one collection conduit (26). The differential pressure is delivered by controlling a system of valves (30) that is connected to at least one higher pressure air conduit (32) and at least one lower pressure air conduit (34) or removes air to or from the waste transport conduit respectively. Both the at least one higher pressure air conduit (32) and at least one lower pressure air conduit (34) is connected to air handling apparatus.

11 Claims, 19 Drawing Sheets

(56) References Cited

U.S. PATENT DOCUMENTS

| | | | |
|---|---|---|---|
| 5,211,514 A * | 5/1993 | Morimoto et al. | 406/186 |
| 5,230,842 A * | 7/1993 | Munde | 264/34 |
| 5,853,629 A * | 12/1998 | Toyoda et al. | 264/35 |
| 7,213,290 B2 * | 5/2007 | Martin et al. | 15/104.061 |
| 7,347,649 B2 * | 3/2008 | Duerr et al. | 406/49 |
| 7,972,089 B2 * | 7/2011 | Auriol et al. | 406/192 |
| 2010/0065131 A1 * | 3/2010 | Grooms | 137/205 |
| 2011/0013993 A1 * | 1/2011 | Sundholm | 406/151 |
| 2013/0078042 A1 * | 3/2013 | Sundholm | 406/41 |
| 2013/0220893 A1 * | 8/2013 | Sukkar | 209/147 |
| 2013/0243536 A9 * | 9/2013 | Arrabal et al. | 406/117 |
| 2013/0340793 A1 * | 12/2013 | Lund | 134/22.11 |

* cited by examiner

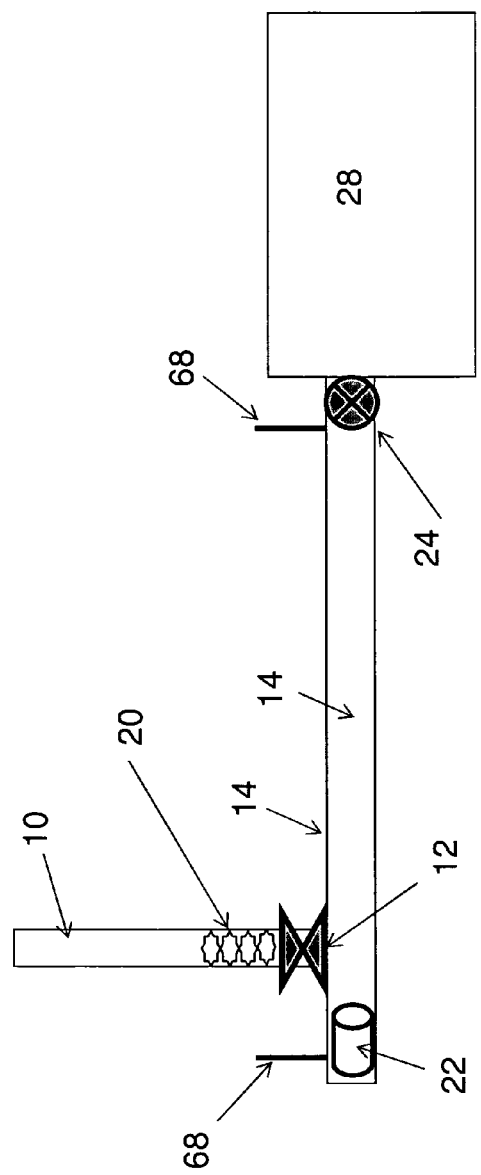
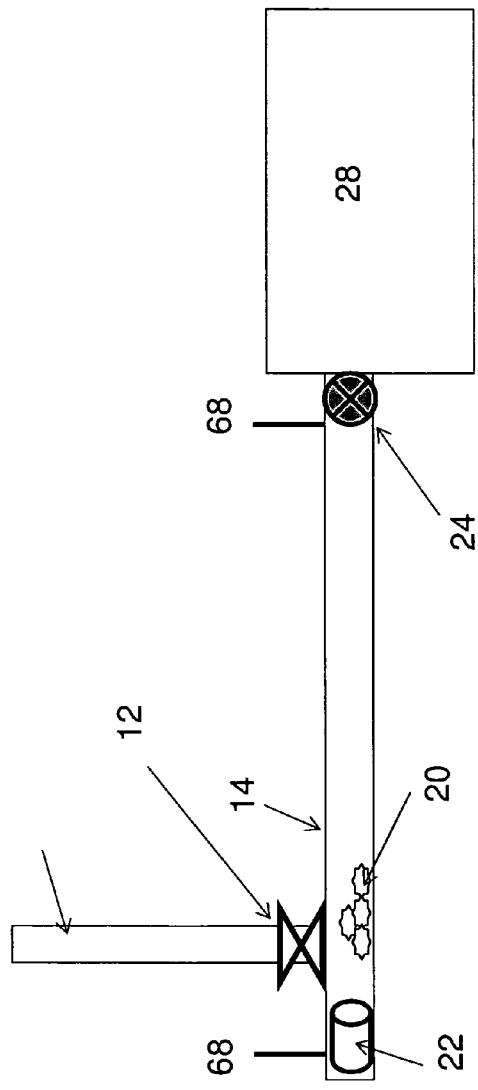

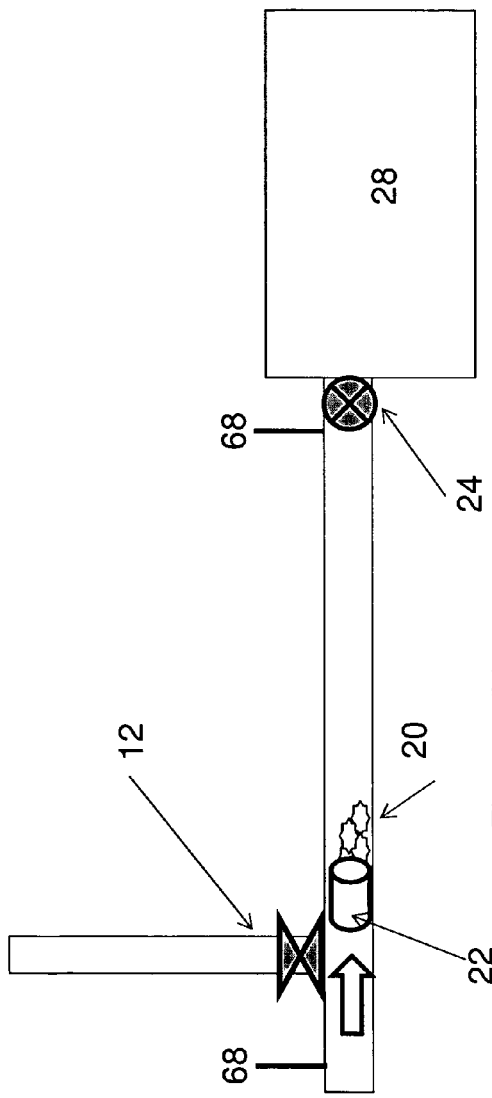
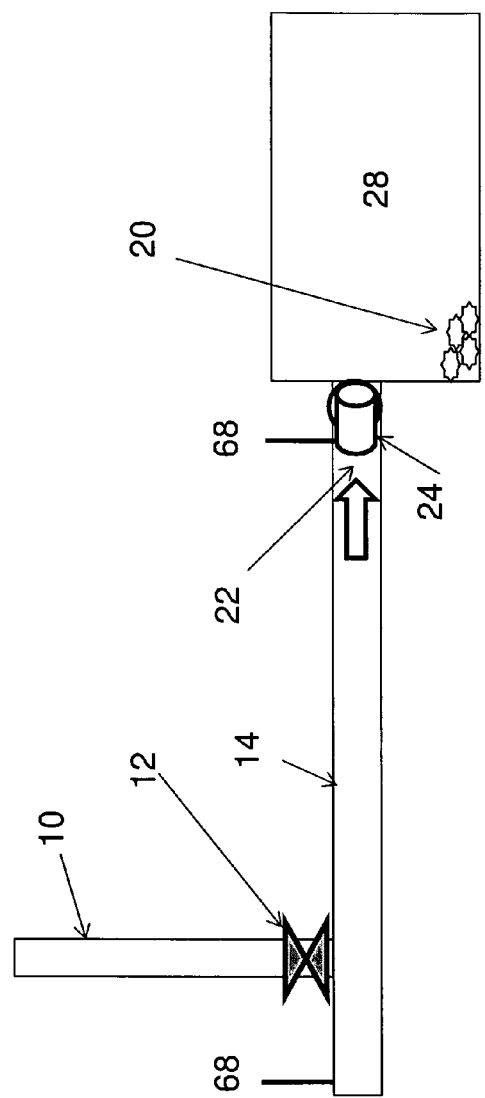

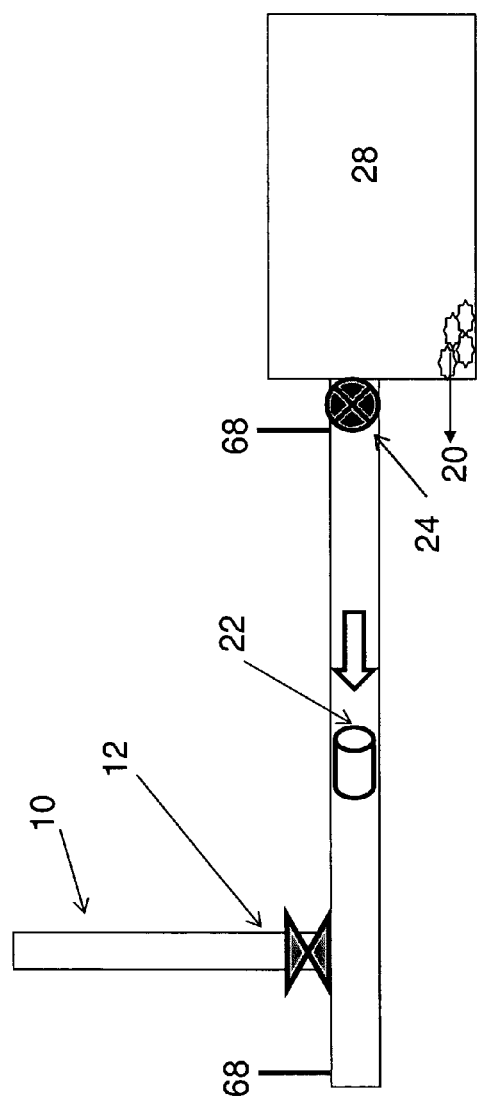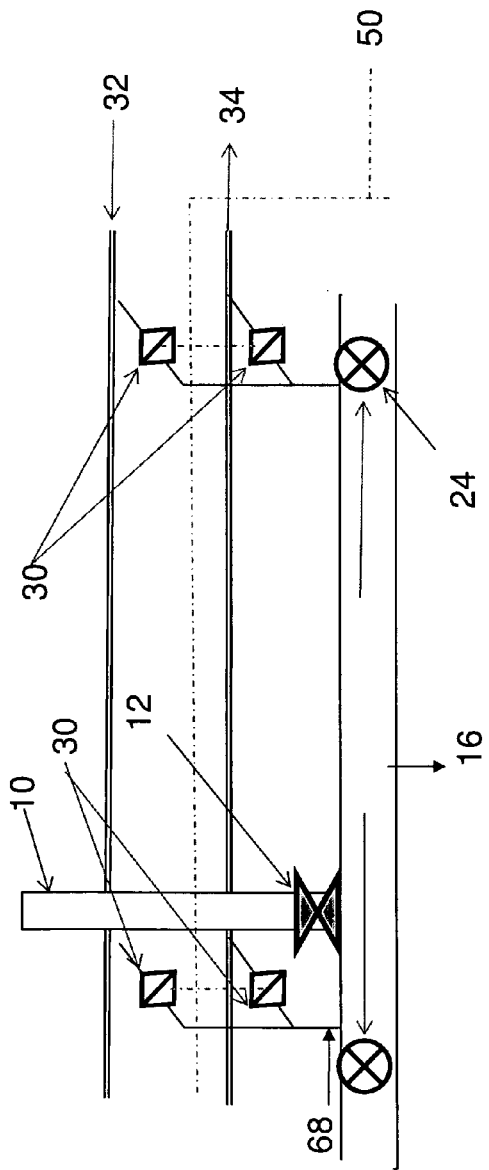

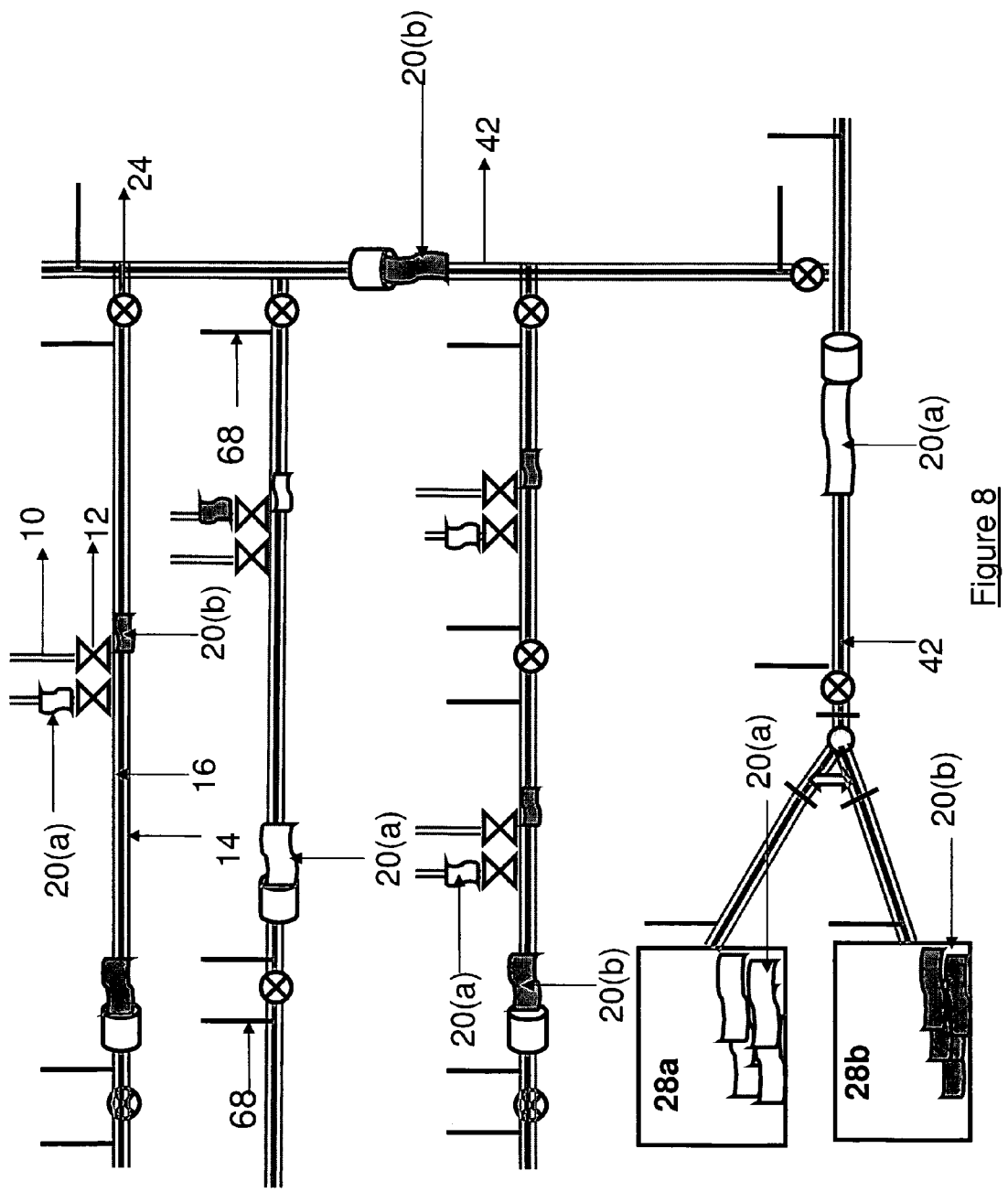

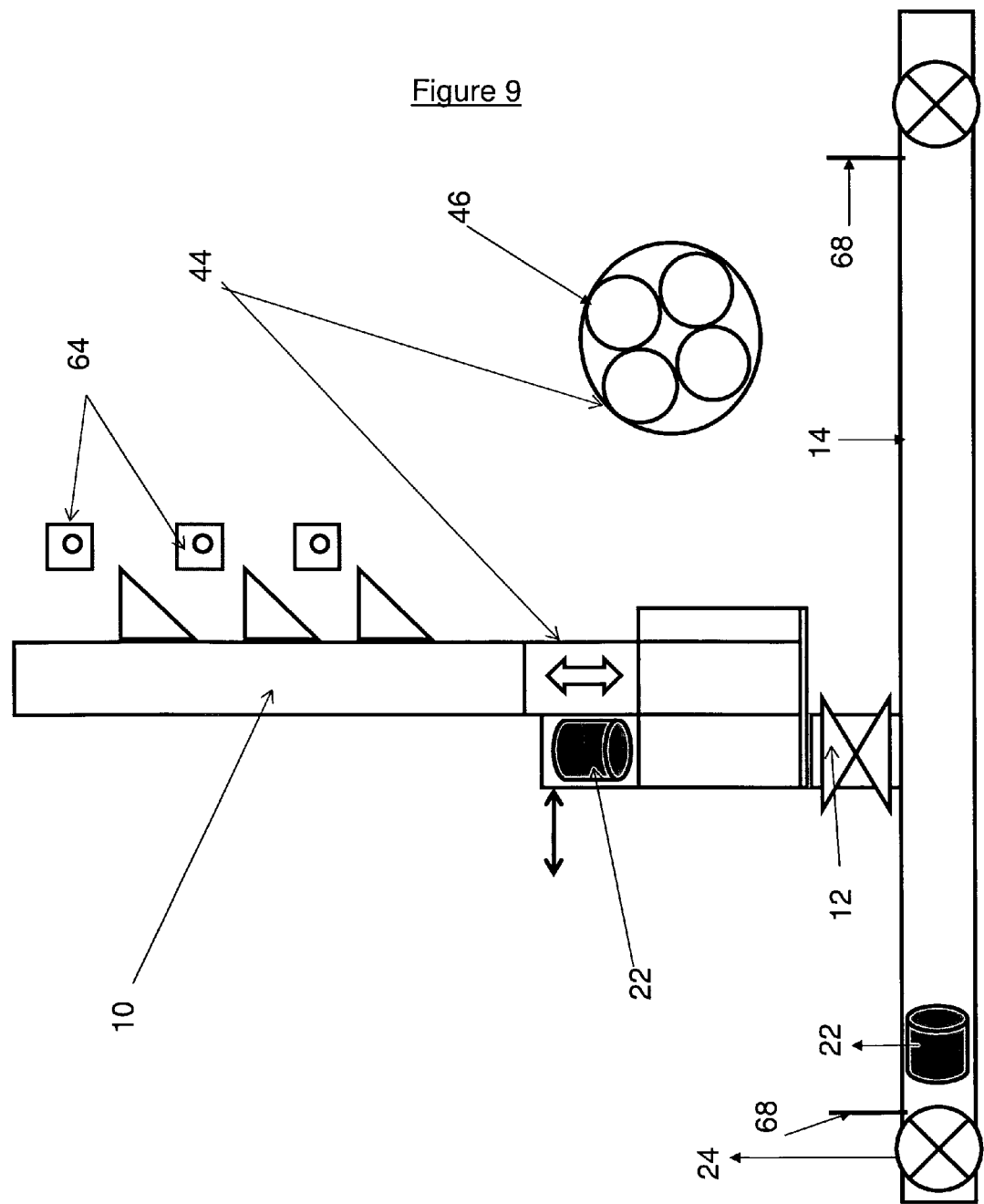

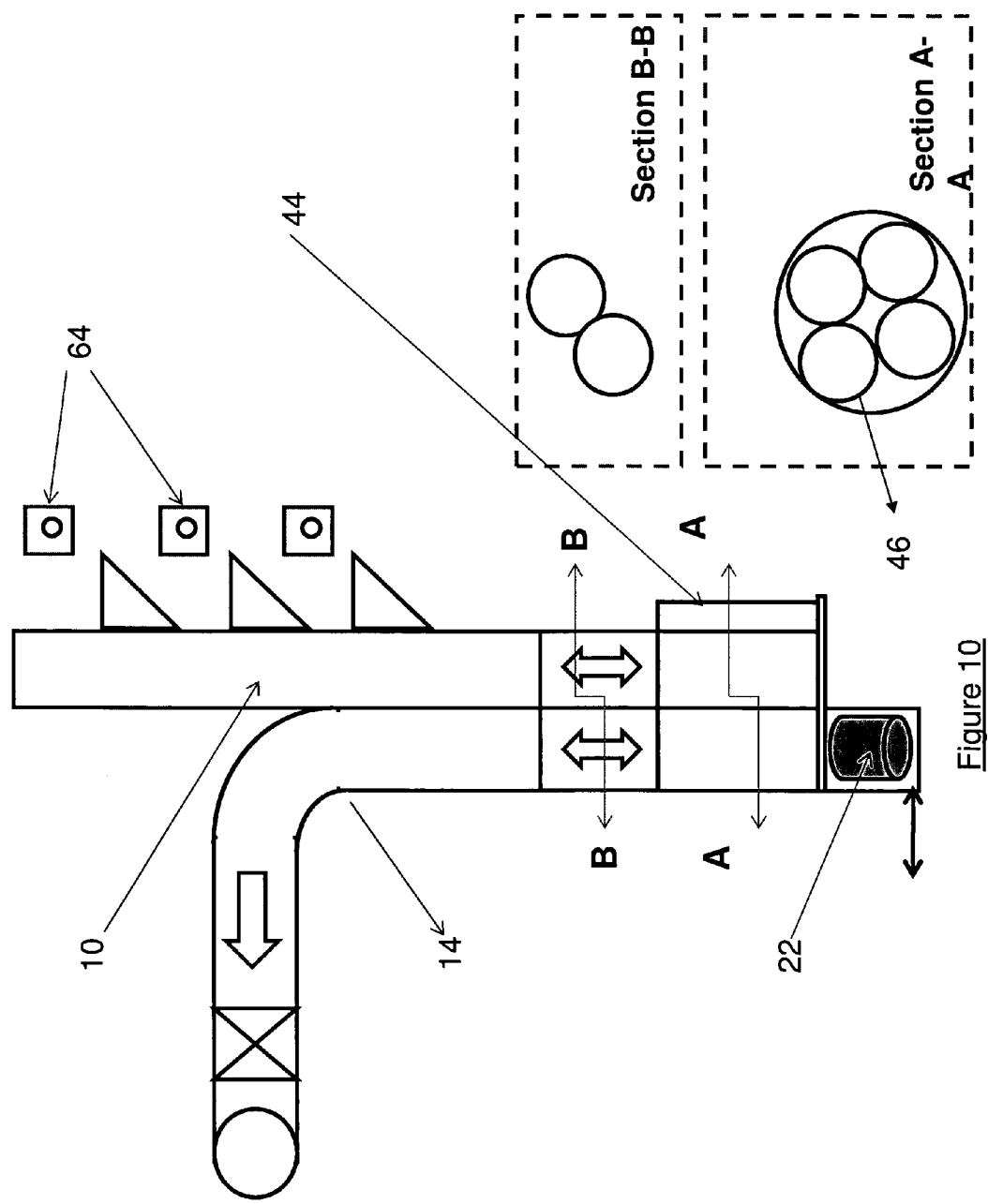

METHOD AND SYSTEM FOR PUSHING AND MOVING SOLID WASTE

FIELD OF INVENTION

The present invention relates to a method and system for conveying solid waste from at least one holding area to at least one waste collection station.

BACKGROUND OF THE INVENTION

Existing Pneumatic Solid Waste Collection Systems (PSWCS) convey solid waste by air movement from several intermediate holding areas (IHA) which are fed by indoor gravity chutes or outdoor throw stations to a central collection point called the Refuse Collection Station (RCS) by a network of surface and underground pipes and air valves. The solid waste which is temporarily stored in a plug is broken up by an air stream to move the solid waste in a rare or dispersed phase allowing for the solid waste to move in smaller dispersed parts.

The RCS itself is a self-contained facility combining major components of refuse separator(s), compactor(s), container(s), vacuum equipment, compressed air system, filtration system(s), deodorising system(s), valves, pipes, control system and electrical power supply panel.

In large developments there would be several self-contained RCS each covering a section of the development. The limitation of the system is the maximum conveying distance of the solid waste between the furthest IHA and the RCS which is about 2.5 kilometers, after which the system becomes extremely inefficient in terms of energy efficiency.

Whilst the concept of PSWCS is readily accepted by most building owners and managers alike, the greatest obstacles remain high investment cost, lack of space within the development and maintenance of specialised equipment in such a facility that has to be undertaken by skilled technicians.

The existing method that is adopted to minimise space and upfront capital expenditure is by using multiple temporary storage compartments at base of collection chutes connected to a fixed solid waste collection conduit that terminates at one or more docking stations to which a mobile vacuum truck periodically affixes a hose to suck the solid waste from the temporary storage compartments. Whilst capital expenditure to this development is lower in absence of permanent plant room, vacuum truck service has to be frequent, is expensive, very noisy during collection mode and very limited in service vendors due to major capital expenditure of the vacuum trucks. A further problem is that as vacuum plant is now mounted on the vacuum truck which makes the vacuum truck very heavy. Furthermore, dead weight of the vacuum truck makes it extremely wasteful in terms of fuel consumption and very high on maintenance costs. In short the capital expenditure to developer is reduced but operating life cycle costs to the development is very high and dependent on a limited vendor source.

Conventionally designed PSWCS use pipes that generally vary in diameter from 400 mm to 500 mm although in exceptional cases where very long solid waste transfer distances are required, the pipes can reach up to 600 mm diameter. General principle for conventional design is to have one size diameter of waste transport conduit for the entire PSWCS. Problem using the 600 mm diameter pipe for conveying of the solid waste is that sub-atmospheric pressures to generate huge quantities of air movement is needed to be generated by vacuum equipment to maintain minimum air speed in the pipes required for conveying the waste. This translates to use of very costly and high powered vacuum equipment to generate sub-atmospheric pressures to create air movement which in turn leads to high operating costs for the PSWCS.

Another shortcoming of conventional design which indirectly leads to a disproportionate higher initial investment cost is the idling of system between conveying cycles. Typically operating time of vacuum equipment in smaller developments may be no more than 90 minutes in a day.

Another problem with conventionally designed systems conveying large masses of solid waste over very long distances at high speeds is the problem of abrasion in pipes. Due to this abrasion, steel pipes have often been selected as the most suitable material. The downside of this material though has been corrosion as solid waste is often wet and generates a highly acidic liquid called leachate which attacks metals. The corrosive attack on both the internal and external surfaces of the pipe can be reduced with cathodic protection which is costly and requires regular inspection and maintenance. Generally the longer the pipe in a system the larger the area covered, the higher the solid waste load, the greater the abrasion, the thicker the pipes have to be resulting in higher capital costs.

The problem with traditional PSWCS is that smaller developments limited to one or two buildings tend to avoid investing in the system due to the high initial capital cost and large space requirement for the RCS.

The scope of the present invention is to address these concerns and to allow for a greater penetration of these useful systems into large developments and districts that may be under planning, in construction or even existing but in the process of being upgraded.

SUMMARY OF THE INVENTION

The present invention relates to a method for conveying solid waste from at least one holding area into at least one collection conduit or at least one collection station comprising steps of discharging the solid waste from each holding area to a waste transport conduit wherein the method further includes the steps of pushing and moving the solid waste in the waste transport conduit to the at least one collection conduit or at least one collection station by using moving means and controlling the moving means to be returned to its original position.

The present invention also relates to a system for pneumatic conveying of solid waste from at least one holding area into at least one collection station or at least one collection conduit wherein at least one holding area is connected to a waste transport conduit wherein the system includes at least one moving means placed inside the waste transport conduit for moving the solid waste discharged from the each holding area to the at least one collection station or at least one collection conduit.

Besides that, the present invention relates a method for pneumatic conveying of solid waste from at least two holding areas into at least two collection stations or at least two collection conduits wherein at least two types of solid waste collected in the at least two holding wherein the method includes steps of discharging one of the at least two types of solid waste in the at least two holding areas to be discharged from the each holding area to a waste transport conduit which comprises at least one moving means inside the waste transport conduit, generating a differential pressure across the at least one moving means to create movement of the at least one moving means to push the solid waste towards the at least two collection stations or the at least two collection conduits and generating differential pressure across the at least one moving means to create movement of the at least one moving means towards its starting position.

The present invention also relates to a system for pneumatic conveying of solid waste from at least one point of waste generation into at least one collection station or at least one collection conduit wherein the at least one point of waste generation is connected to a waste transport conduit and the system includes at least one moving means placed inside the waste transport conduit for moving the solid waste discharged from the each point of waste generation to the at least one collection station or the at least one collection conduit.

BRIEF DESCRIPTION OF THE DRAWINGS

The present invention will become more fully understood from the detailed description given herein below and accompanying drawings which are given by way of illustration only, and thus are not limitative of the present invention, wherein:

FIGS. 1-1(e) shows a diagrammatic view of a system of transporting solid waste from one holding area to collection station using at least one moving means;

FIG. 8 shows a schematic diagram of a system where at least two types of segregated solid waste from holding area can be moved concurrently along respective waste transport conduits with respective moving means;

FIG. 9 shows a diagrammatic view of a rotating carousel comprising several chambers located below the at least one moving means which allow the solid waste to be segregated and conveyed separately through waste transport conduit to the collection station; and FIG. 10 shows a diagrammatic view of a rotating carousel comprising several chambers located above the at least one moving means which allow the solid waste to be segregated and conveyed separately through waste transport conduit to the collection station;

DETAILED DESCRIPTION OF EMBODIMENTS OF THE INVENTION

Figure 2:
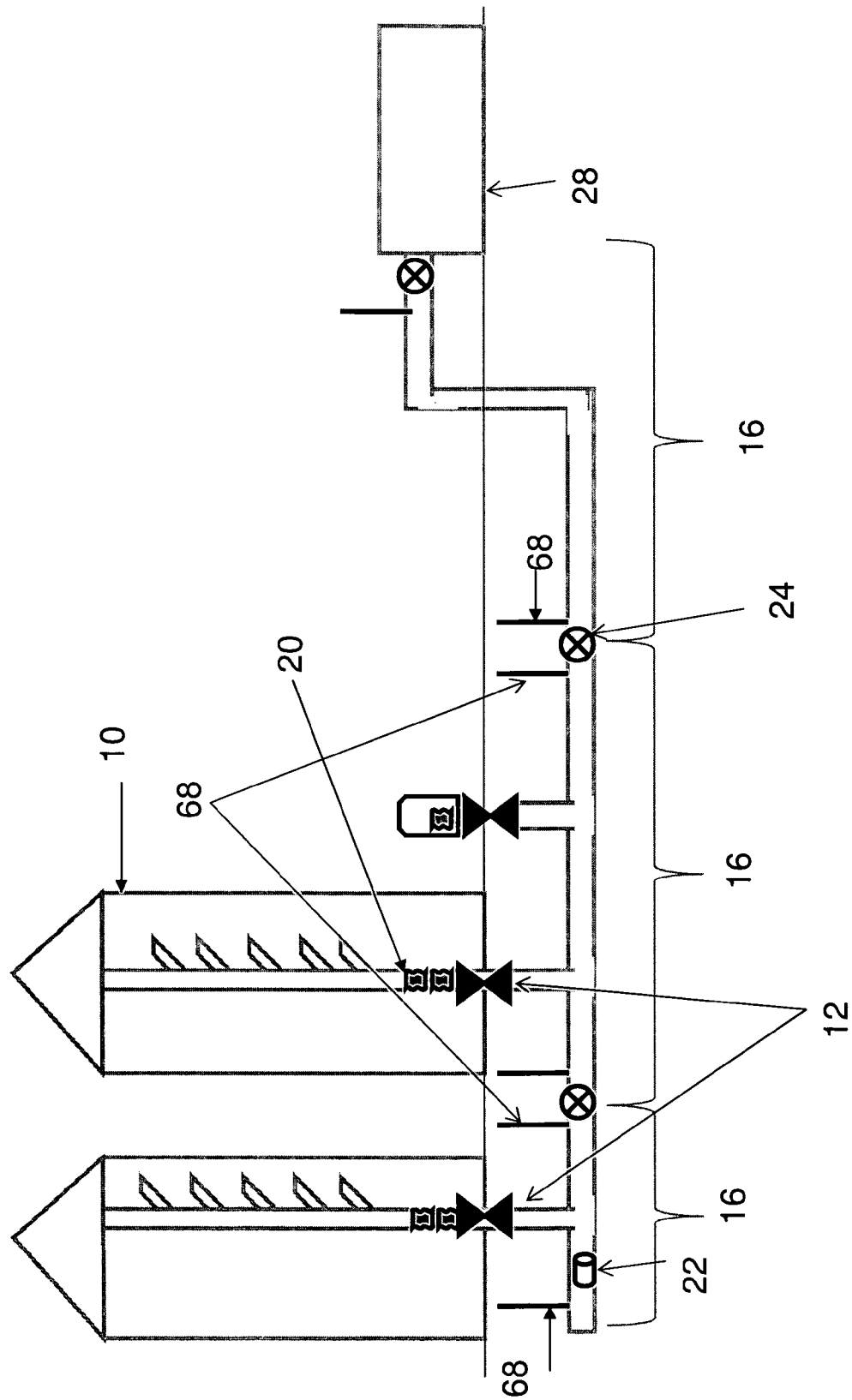
FIG. 2-2(c) shows a diagrammatic view of a system of transporting solid waste from combination of at least one indoor station comprises of high rise buildings and at one least one outside station to collection station using at least one moving means.
Figure 2A:
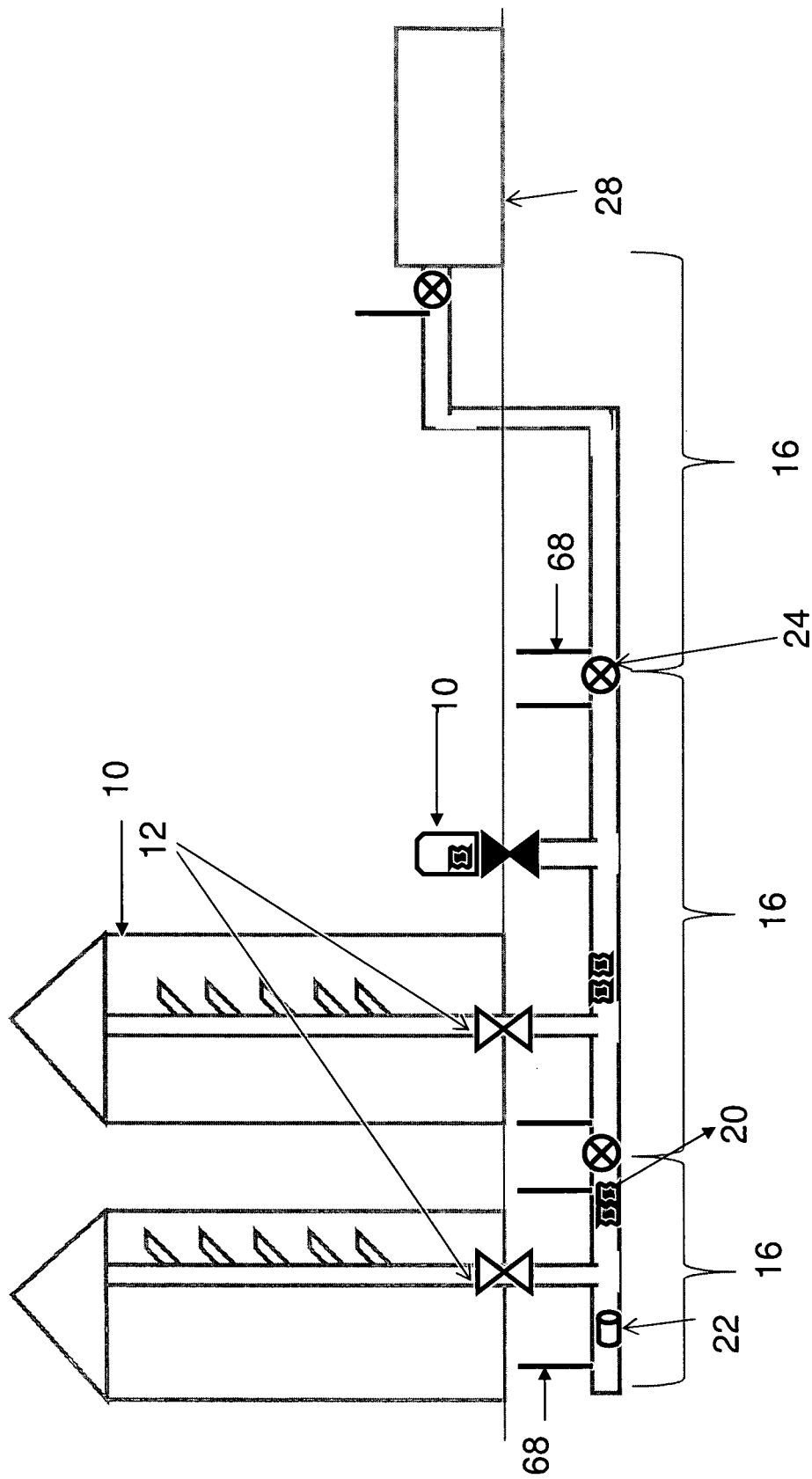
Figure 2B:
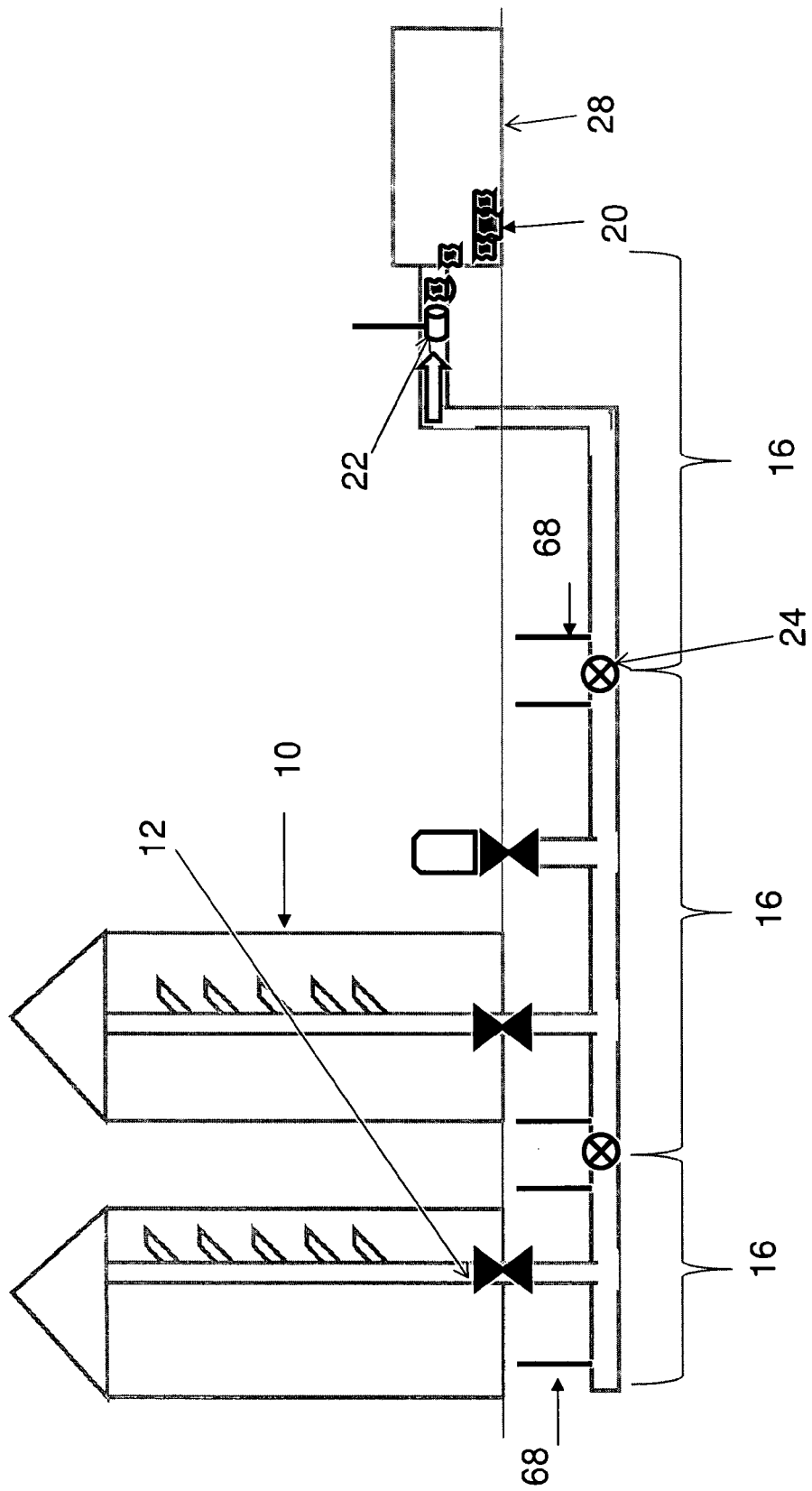
Figure 2C:
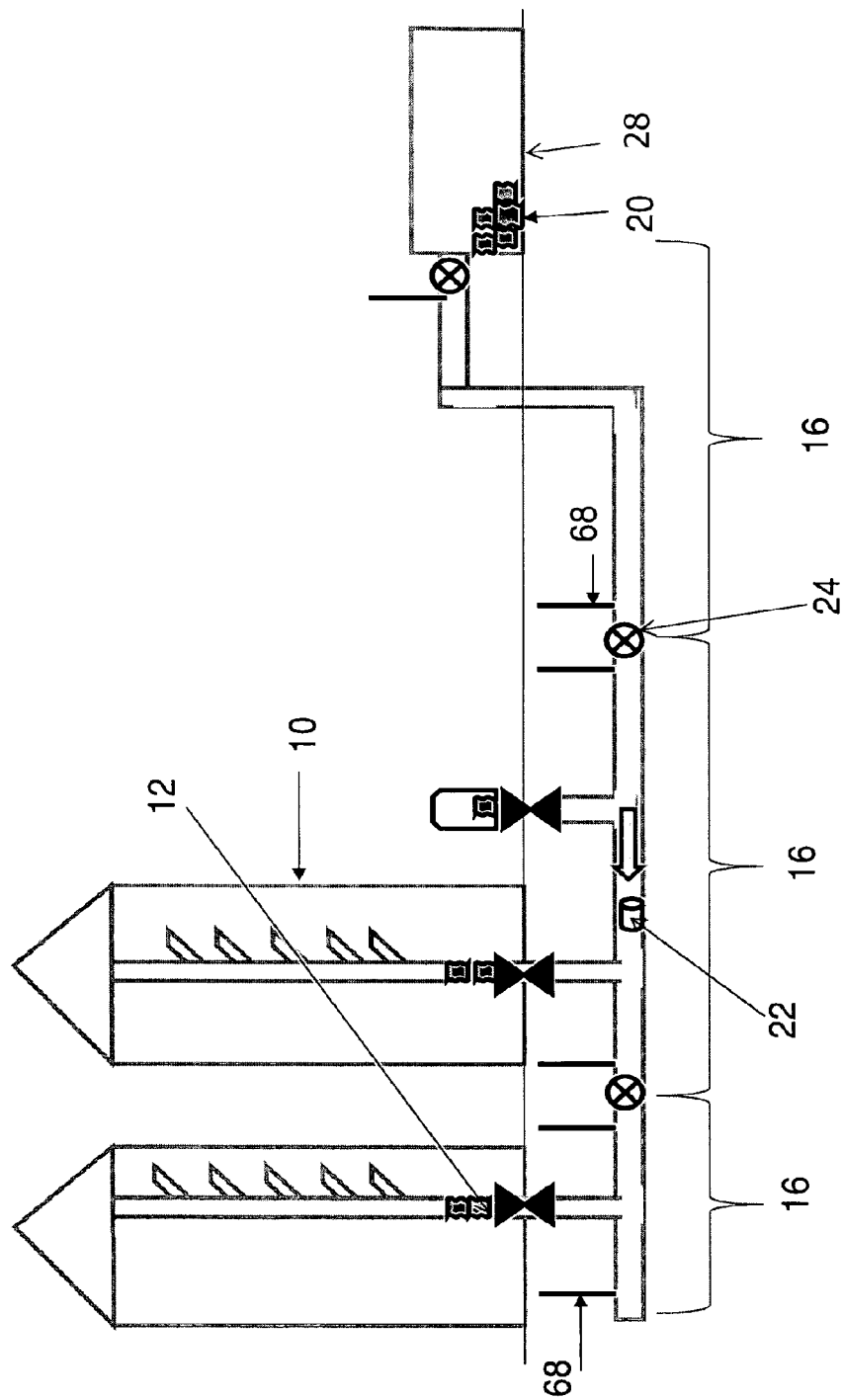

The present invention relates to a method and system of conveying solid waste from at least one holding area (10) into at least one collection station (28) or at least one collection conduit (26) using at least one moving means (22) to push the solid waste through a waste transport conduit (14). The present invention is also known as Automated Waste Shuttle Transport System (AWSTS). The at least one holding area is selected from a group of indoor stations located inside buildings as well as outdoor stations that are located outside the buildings in areas such as parks and recreational areas. The solid waste is selected from a group of recycleable and -non recycleable solid waste.

Two embodiments of the present invention are described herein as shown in FIGS. 1-1(e) and FIG. 2-2(c). The method of the AWSTS comprises steps of periodically and systematically discharging solid waste (20) from each holding area (10) to a waste transport conduit (14). Each holding area includes at least one means for regulating discharge (12) of the solid waste (20). The at least one means for regulating discharge of the solid waste is such as discharge valves. The waste transport conduit (14) includes at least one moving means (22) to push and move the solid waste (20) to the at least one collection conduit (26) or the at least one collection station (28). Optionally a liquid is sprayed on and around the solid waste (20) to act as a lubricant before the at least one moving means pushes the solid waste (20) through the waste transport conduit (14). The liquid is selected from a group of lubricant such as water, oil and etc. The discharge of the solid waste (20) is initiated by generating differential pressure between each holding area (10) and the waste transport conduit (14) to allow discharging of the solid waste (20) into the waste transport conduit (14). Generating of the differential pressure between the at least one holding area (10) and waste transport conduit (14) is known to a person skilled in the art. The differential pressure can be generated by various means but always by having a higher air pressure in the at least one holding area (10) and a lower air pressure in the waste transport conduit (14).

To generate differential pressure across the at least one holding area (10) and waste transport conduit (14), air has to be supplied to the at least one holding area and/or removed from the waste transport conduit. The differential pressures can be created by using the following method:

a) a higher pressure air conduit (32) supplied by a positive pressure (compared to atmospheric pressure) in the at least one higher pressure air conduit (32) and atmospheric or sub-atmospheric pressure in the at least one lower pressure conduit (34);

b) a higher pressure air conduit (32) supplied by atmospheric pressure in the at least one higher pressure air conduit (32) and sub-atmospheric pressure in the at least one lower pressure air conduit (34).

The at least one higher pressure air conduit (32) and the at least one lower pressure air conduit (34) at one end are connected to an air handling apparatus (not shown in the figure) and the other end of the at least one higher pressure air conduit (32) and the at least one lower pressure air conduit (34) are linked to at least one air valve (30) which are connected to the waste transport conduit (14) by at least one connecting conduit (68). Therefore, the at least one connecting conduit (68) will be able to supply or remove air to or from the waste transport conduit (14) respectively that was created by using the following method described above and generate the required differential pressure across the at least one holding area (10) and the waste transport conduit (14). Once the differential pressure is created, the means for regulating discharge (12) of the solid waste opened and the solid waste is pushed and pushed into waste transport conduit (14).

Where the waste transport conduit (14) is required to have a sub-atmospheric pressure, at least one zone valve (24) is placed in the waste transport conduit (14) to isolate pressure conditions in the waste transport conduit (14). Once the differential pressure is created between the at least one holding area (10) and the waste transport conduit (14) the means for regulating (12) discharge of the solid waste is opened and the solid waste is pushed into the waste transport conduit (14).

The at least one zone valve (24) is used to isolate the waste transport conduit (14) into at least one conveying zone (16) to allow for the each conveying zone (16) to create a flow of air within the conveying zone (16) to urge the at least one moving means (22) to move and push the solid waste (20) towards the at least one collection station (28) or at least one collection conduit (26). The at least one zone valve (24) allows for controlling differential pressure within the at least one conveying zone (16) without affecting other conveying zones (16).

The at least one moving means (22) is urged to push and move the solid waste in the waste transport conduit (14) by generating differential pressure across the at least one moving means (22) which allows movement of the at least one moving means (22). In any case the movement of the at least one moving means (22) is created by altering pressure conditions on one or both sides of the at least one moving means (22) which results in the moving of the at least one moving means (22) in the direction of lower pressure. The differential pressure can be generated by various ways. To create differential pressure across the at least one moving means (22), air has to be supplied to and/or removed from the waste transport conduit (14) from one or both sides of the at least one moving means (22). This is done by opening at least one air valve (30) connected to at least one air higher pressure air conduit (32) or lower pressure air conduit (34) which has a different pressure from the waste transport conduit (14). The differential pressures can be created by using the following method:

a) a higher pressure air conduit (32) supplied by a positive pressure (compared to atmospheric pressure) in the at least one higher pressure air conduit (32) and atmospheric or sub-atmospheric pressure in the at least one lower pressure conduit (34);

b) a higher pressure air conduit (32) supplied by atmospheric pressure in the at least one higher pressure air conduit (32) and sub-atmospheric pressure in the at least one lower pressure air conduit (34).

Both the at least one higher pressure air conduit (32) and lower pressure air conduit (34) at one end are connected to an air handling apparatus (not shown in the figure) and the other end of the at least one higher pressure air conduit (32) and the at least one lower pressure air conduit (34) are linked to at least one air valve (30) which are connected to the waste transport conduit (14) by at least one connecting conduit (68). Therefore, the at least one connecting conduit (68) will be able to supply or remove air to or from the waste transport conduit (14) respectively and generate the required differential pressure across the at least one moving means (22) to create movement of the at least one moving means (22) to move and push the solid waste.

The at least one zone valve (24) at the at least one collection station opens and allows the at least one moving means (22) to push the solid waste (20) into the at least one collection station (28) or the at least one collection conduit (26). The solid waste (20) is pushed into a container or hopper inside the collection station (28) by the at least one moving means (22). Before the solid waste (20) reaches the at least one collection station, the solid waste (20) is compressed in a pressing means to compress and remove the lubricant that was sprayed on and around the solid waste before it was discharged to the waste transport conduit (14).

After delivering the solid waste (20) into the at least one collection station (28), the at least one zone valve (24) is closed and a differential pressure across the at least one moving means (22) is reversed to allow movement of the at least one moving means (22) back towards its starting position. In any case the movement of the at least one moving means (22) is created by altering pressure conditions on one or both sides of the at least one moving means (22) which results in the moving of the at least one moving means (22) in the direction of lower pressure.

Figure 3:
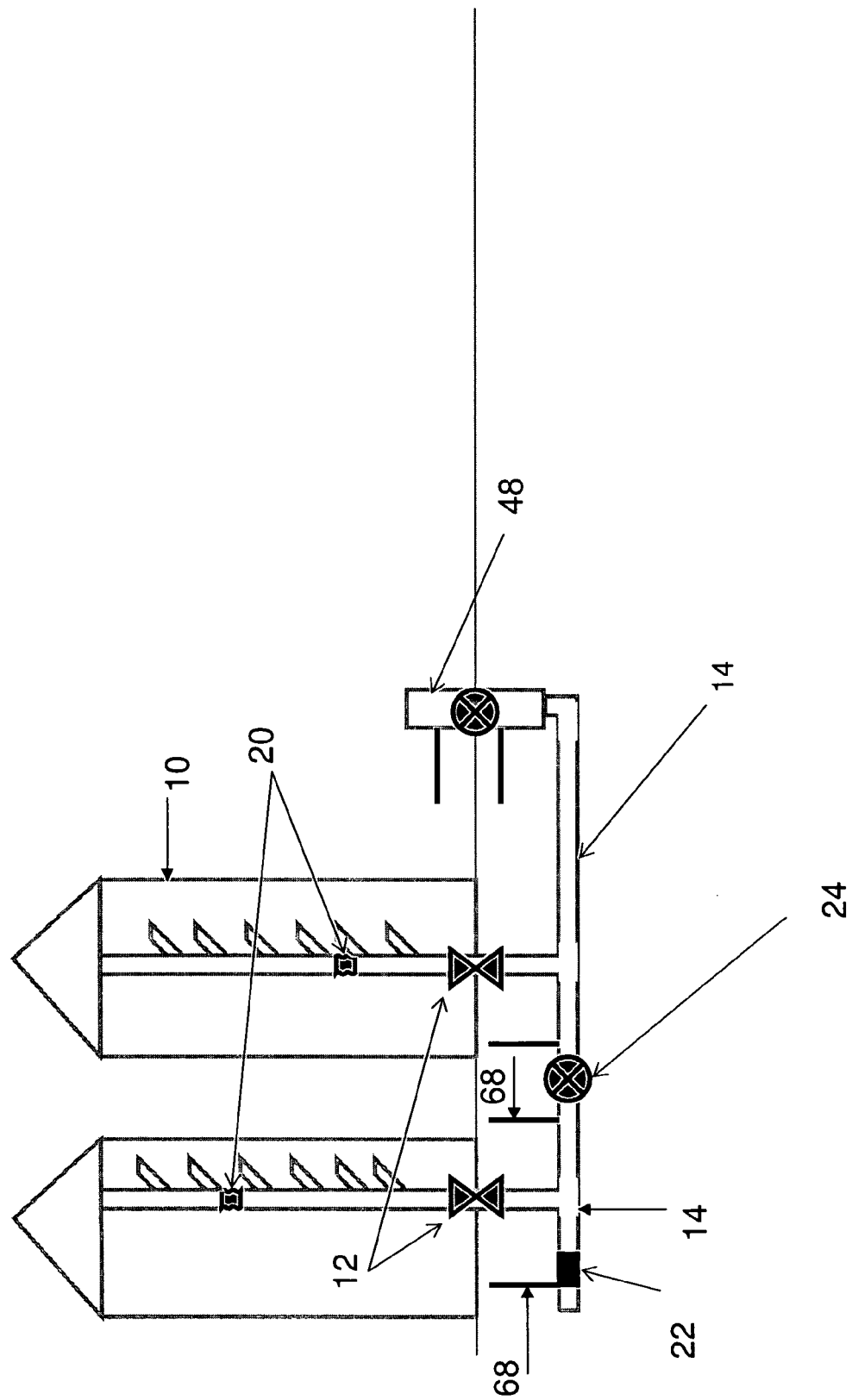
FIGS. 3-3(d) shows a diagrammatic view of a fixed portion of transporting the solid waste and mobile portion of transporting the solid waste from the holding area to a vehicle mounted container.
Figure 3A:
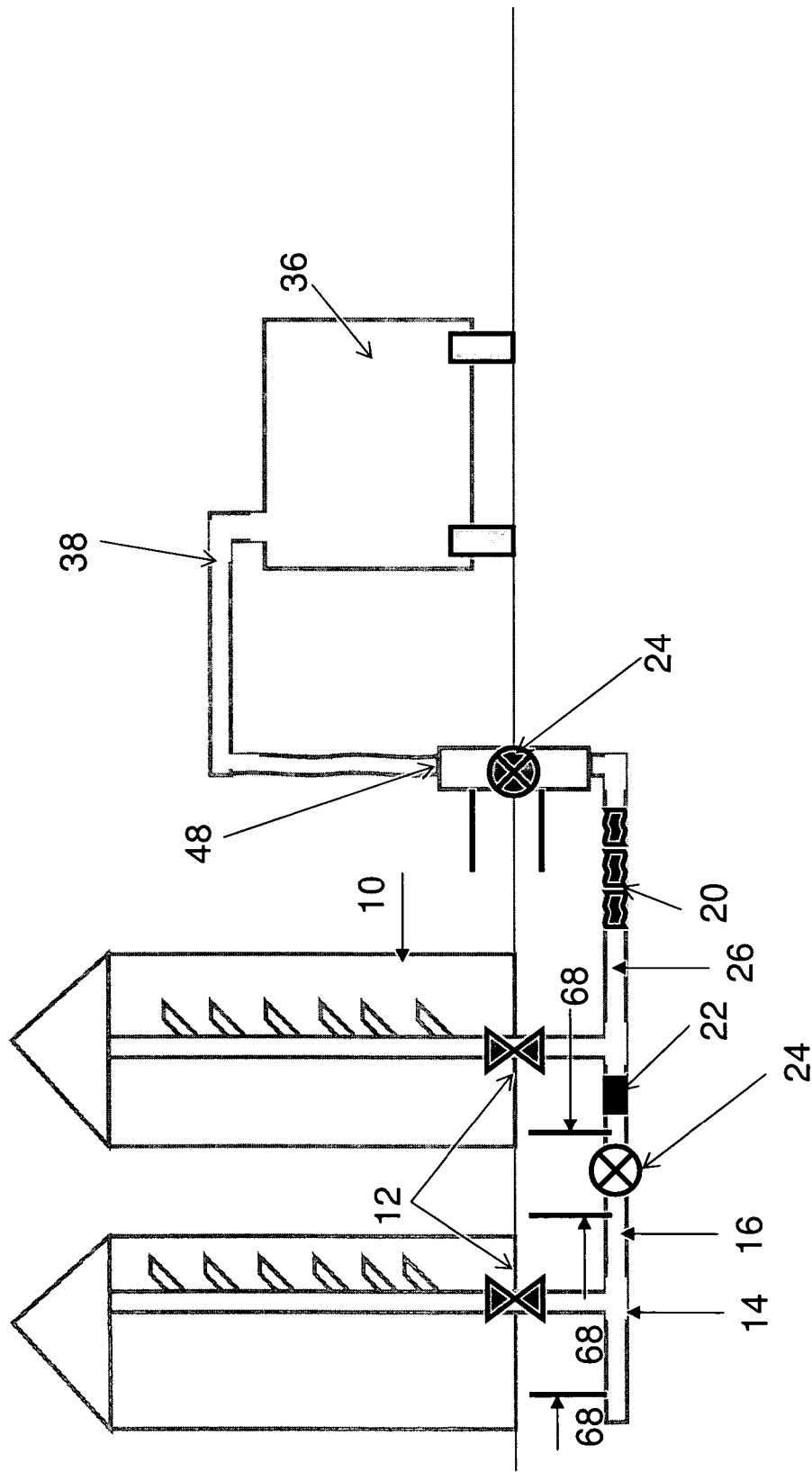
Figure 3B:
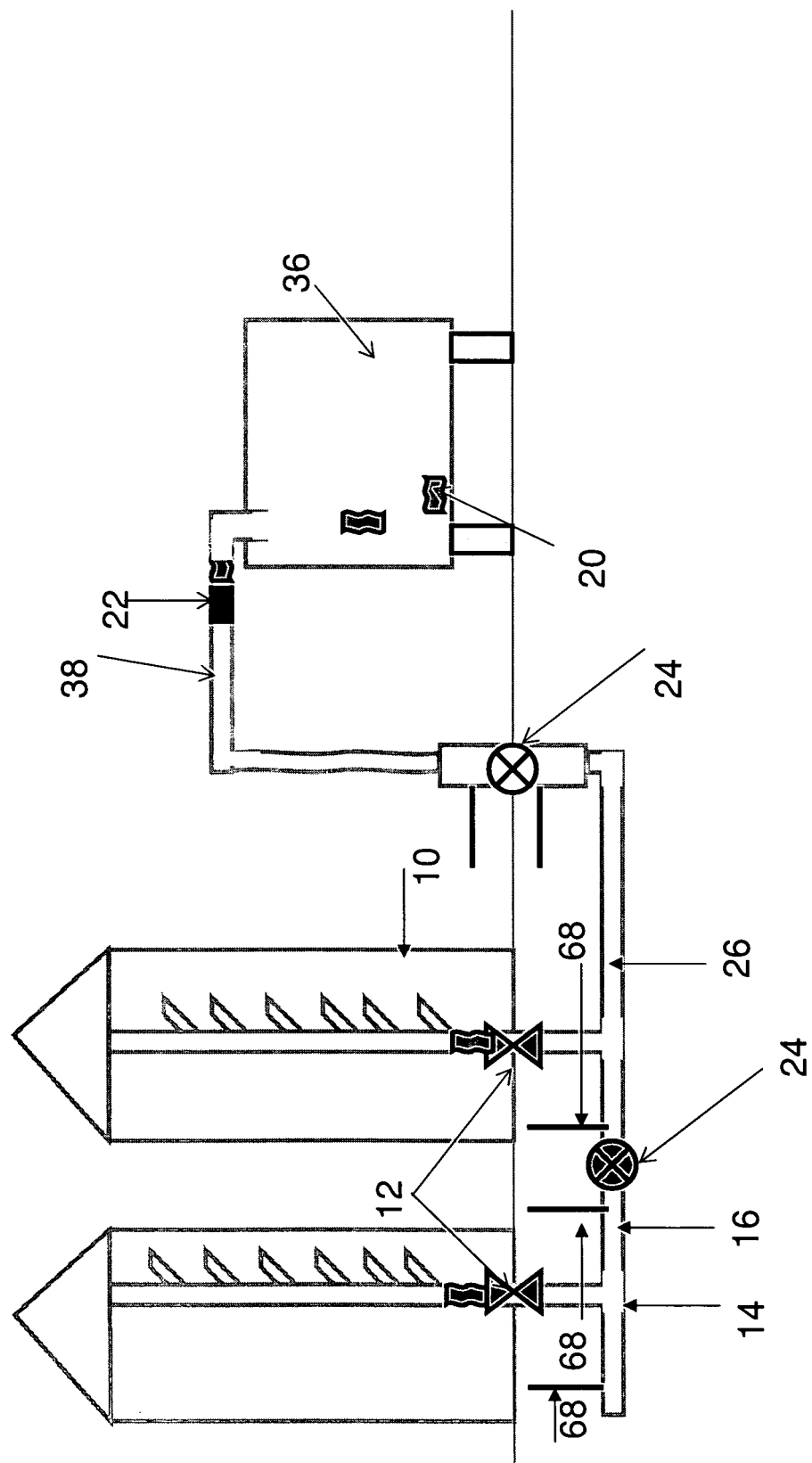
Figure 3C:
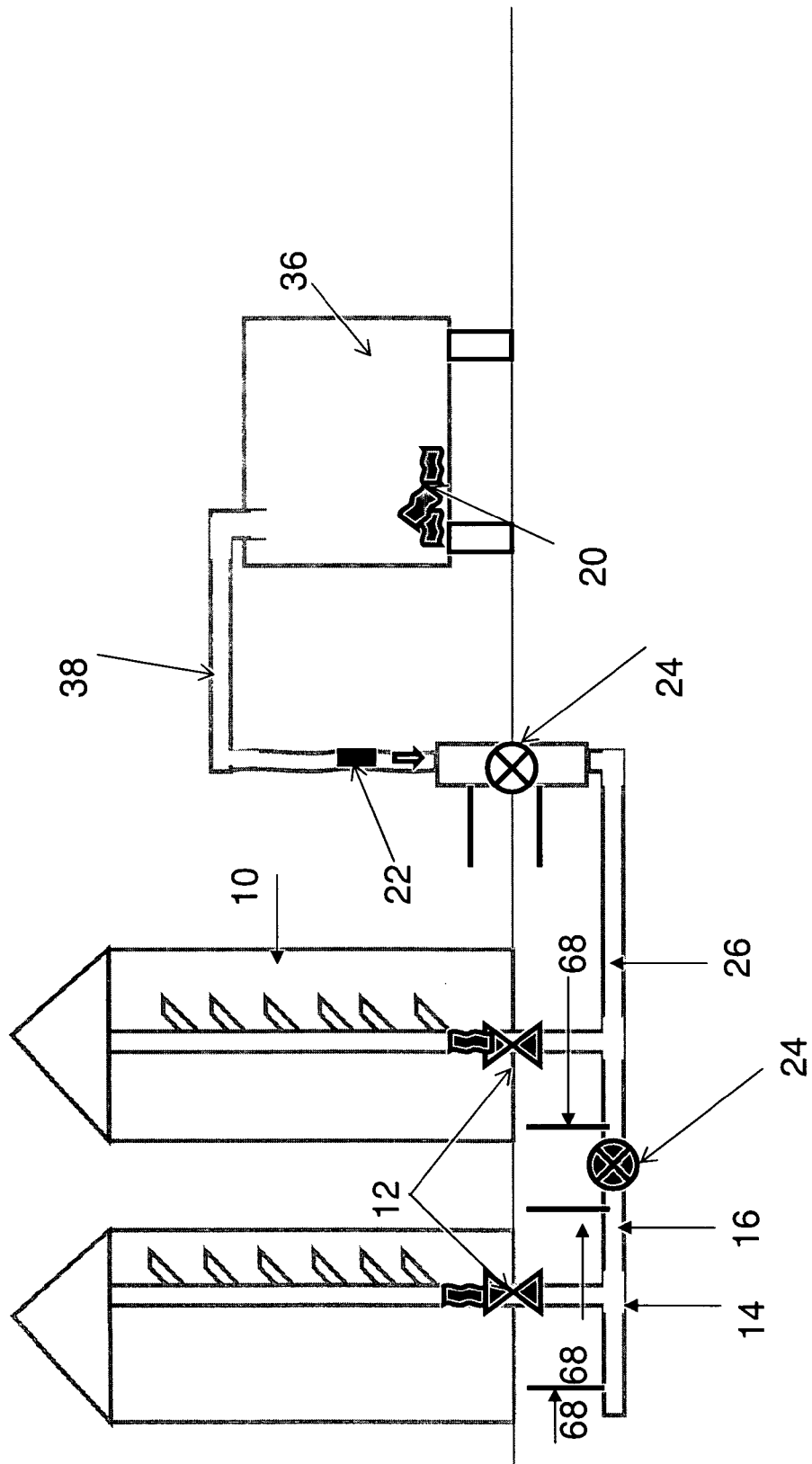
Figure 3D:
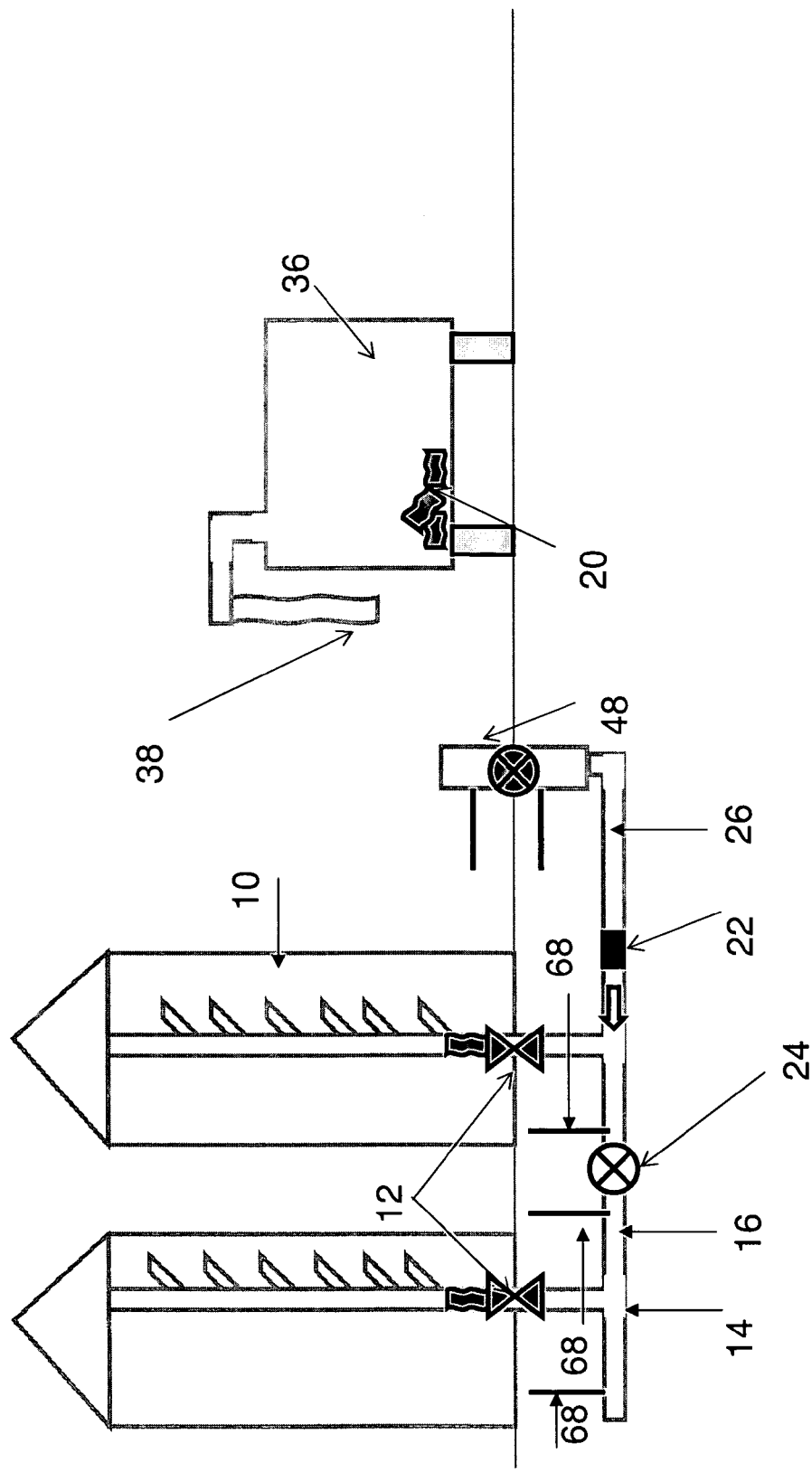

When the solid waste is delivered to the at least one collection conduit (26), the solid waste can be moved from the at least one collection conduit (26) to a mobile vehicle (36) mounted solid waste container as shown in FIGS. 3-3(d). The solid waste (20) from the collection conduit (26) is moved to a docking station (48) before being transported to the mobile vehicle (36) mounted solid waste container. The mobile vehicle (36) with mounted solid waste container is able to communicate with the docking station (48) by at least one retractable conduit (38) mounted on the mobile vehicle (36) which connects the docking station (48) and the mobile vehicle (36). The at least one moving means (22) that pushes the solid waste (20) to the at least one collection conduit (26) further pushes the solid waste into the mobile vehicle (36) mounted solid waste container through the docking station (48) and the at least one retractable conduit (38). The docking station (48) includes at least one zone valve for controlling movement and pressure conditions of the solid waste (20) from the at least one collection conduit (26) to the at least one retractable conduit (38). Alternatively, the solid waste (20) can be compacted into a plug in the at least one collection conduit (26) and can then be moved by generating differential pressure between the at least one collection conduit (26) and the vehicle mounted solid waste container (36). When the at least one moving means (22) is used for the movement of the solid waste to the vehicle mounted solid waste container (36) then the at least one moving means (22) is to be returned to the collection conduit (26) before the at least one retractable conduit (38) is uncoupled from the docking station (48). The at least one moving means (22) is returned to the at least one collection conduit (26) by generating a reversed differential pressure across the at least one moving means (22) to allow movement of the at least one moving means (22) back towards its starting position. In any case the movement of the at least one moving means is created by altering the pressure conditions on one or both sides of the at least one moving means (22) which results in the moving of the at least one moving means (22) in the direction of lower pressure.

The present invention also relates to a system of apparatus for conveying solid waste from at least one holding area (10) into at least one collection station (28) or at least one collection conduit (26). The at least one holding area (10) includes at least one means for regulating discharge (12) of the solid waste (20) to a waste transport conduit (14). The waste transport conduit (14) includes at least one moving means (22) that moves and pushes the solid waste discharged from the at least one holding area (10) to the at least one collection station (28) or the at least one collection conduit (16). The at least one moving means (22) can be like a shuttle that moves the solid waste towards the at least one collection station (28) or at least one collection conduit (26). The at least one holding area (10) is inside buildings and outdoor stations. The outdoor stations are waste collection stations that are located outside the buildings in areas such as parks and recreational areas. Besides that, when the at least one holding area (10) is next to a point where solid waste is generated, i.e. kitchen, it also preferably includes a flushing water closet (40) to flush solid waste into the at least one holding area (10) from where the solid waste is discharged into the waste transport conduit (14) and the at least one moving means (22) pushes the solid waste (20) towards the at least one collection conduit (26) or the at least one collection station (28).

Once the solid waste (20) is discharged in the waste transport conduit (14), differential pressure across the at least one moving means (22) is created to move the at least one moving means (22) to push the solid waste to the at least one collection station (28) or at least one collection conduit (26). After moving the solid waste (20) to the at least one collection station (28) or the at least one collection conduit (26), a differential pressure across the at least one moving means (22) is generated and is reversed to allow movement of the at least one moving means (22) back towards its starting position. In any case the movement of the at least one moving means (22) is created by altering pressure conditions on one or both sides of the at least one moving means (22) which results in the moving of the at least one moving means (22) in the direction of lower pressure. The differential pressures can be created by using the following method:
a) a higher pressure air conduit (32) supplied by a positive pressure (compared to atmospheric pressure) in the at least one higher pressure air conduit (32) and atmospheric or sub-atmospheric pressure in the at least one lower pressure conduit (34);
b) a higher pressure air conduit (32) supplied by atmospheric pressure in the at least one higher pressure air conduit (32) and sub-atmospheric pressure in the at least one lower pressure air conduit (34).

Movement of air to alter the differential pressure on one or both sides of the at least one moving means (22) is supervised by a control and monitoring system (50) to ensure smooth operation and control of the at least one moving means (22). The position of the at least one moving means (22) is identified from a device such as a radio frequency identification (RFID) tag or magnet, known to those familiar in the art, which is housed inside the at least one moving means (22) and monitored by sensors connected to the electronic control and monitoring system (50).

Both the at least one higher pressure air conduit (32) and lower pressure air conduit (34) at one end are connected to an air handling apparatus (not shown in the figure) and the other end of the at least one higher pressure air conduit (32) and the at least one lower pressure air conduit (34) are linked to at least one air valve (30) which are connected to the waste transport conduit (14) by at least one connecting conduit (68). Therefore, the at least one connecting conduit (68) will be able to supply or remove air to or from the waste transport conduit (14) respectively and generate the required differential pressure across the at least one moving means (22) to create movement of the at least one moving means (22). The system that is mentioned above is supervised by a control system (50).

In another embodiment wherein the system includes at least one zone valve (24) in the waste transport conduit (14) to allow a differential pressure across the at least one zone valve when it is closed. Generally, the at least one zone valve (24) is required when there is need to create sub-atmospheric pressure in the waste transport conduit (14) to allow discharge of the solid waste (20) from the at least one holding area (10) or to allow movement of the solid waste (20) by the at least one moving means (22) in the waste transport conduit (14). The at least one zone valve (24) provide at least one conveying zone (16) in the waste transport conduit (14). The at least one zone valve (24) allows for controlling differential pressure within the at least one conveying zone (16) without affecting other conveying zones (16).

A plurality of system as mentioned in page 10, line-20-31 and page 11, line 1-3, before moving the solid waste to the at least one collection station (28) or the at least one collection conduit (26) is moved to at least one primary conveying zone (42). The at least one primary zone (42) includes at least one moving means (22) to move the solid waste to the at least one collection station (28) or to the at least one collection conduit (26). The waste transport conduit (14) and the at least one primary conveying zone comprise a range of conduit diameter sizes from 0.075 m to 1.0 m. The at least one collection conduit (26) is connectable to a vehicle mounted container (36) by at least one retractable conduit (38). The solid waste in the at least one collection conduit (26) is moved and pushed by at least one moving means (22) to a docking station (48) which preferably includes at least one zone valve (24) that controls movement of the solid waste to the vehicle mounted container (36) by the at least one retractable conduit (38).

Figure 4:
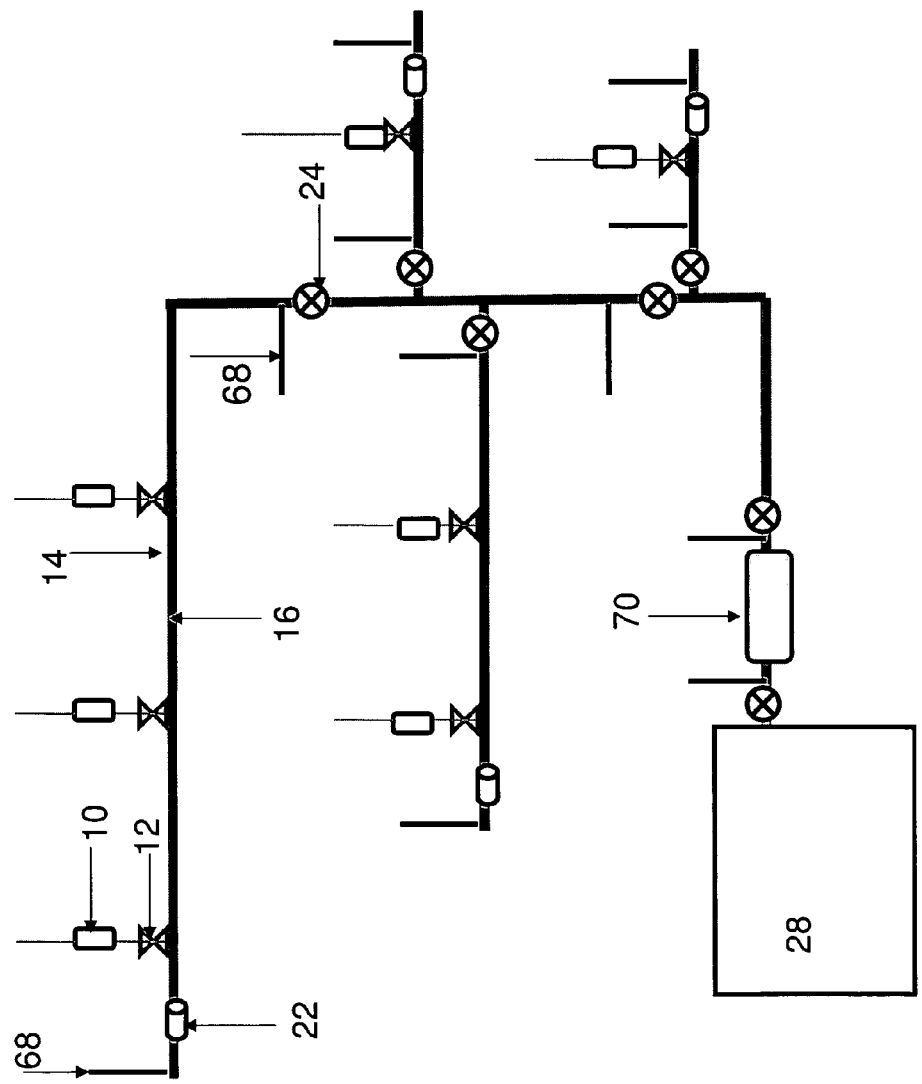
FIG. 4 shows a schematic diagram of a network for at least one holding area for solid waste collection.

FIG. 4 shows the schematic view of a plurality of system described in the page 10, line-20-31 and page 11, line 1-3, for conveying solid waste (20) from the at least one holding area (10) into at least one collection station (28) using at least one moving means (22) to push the solid waste (20) through a waste transport conduit (14). The waste transport conduit includes at least one zone valve (24). The at least one zone valve (24) provide at least one conveying zone (16) in the waste transport conduit (14). Before moving the solid waste to the at least one collection station (28), there is a solid waste compression chamber (70) in which the solid waste is compressed to squeeze excess liquids from the solid waste (20). The method of conveying the solid waste (20) from the at least one holding area (10) into at least one collection station (28) is as described earlier in FIGS. 1-1(e) and FIG. 2-2(c).

Figure 5:
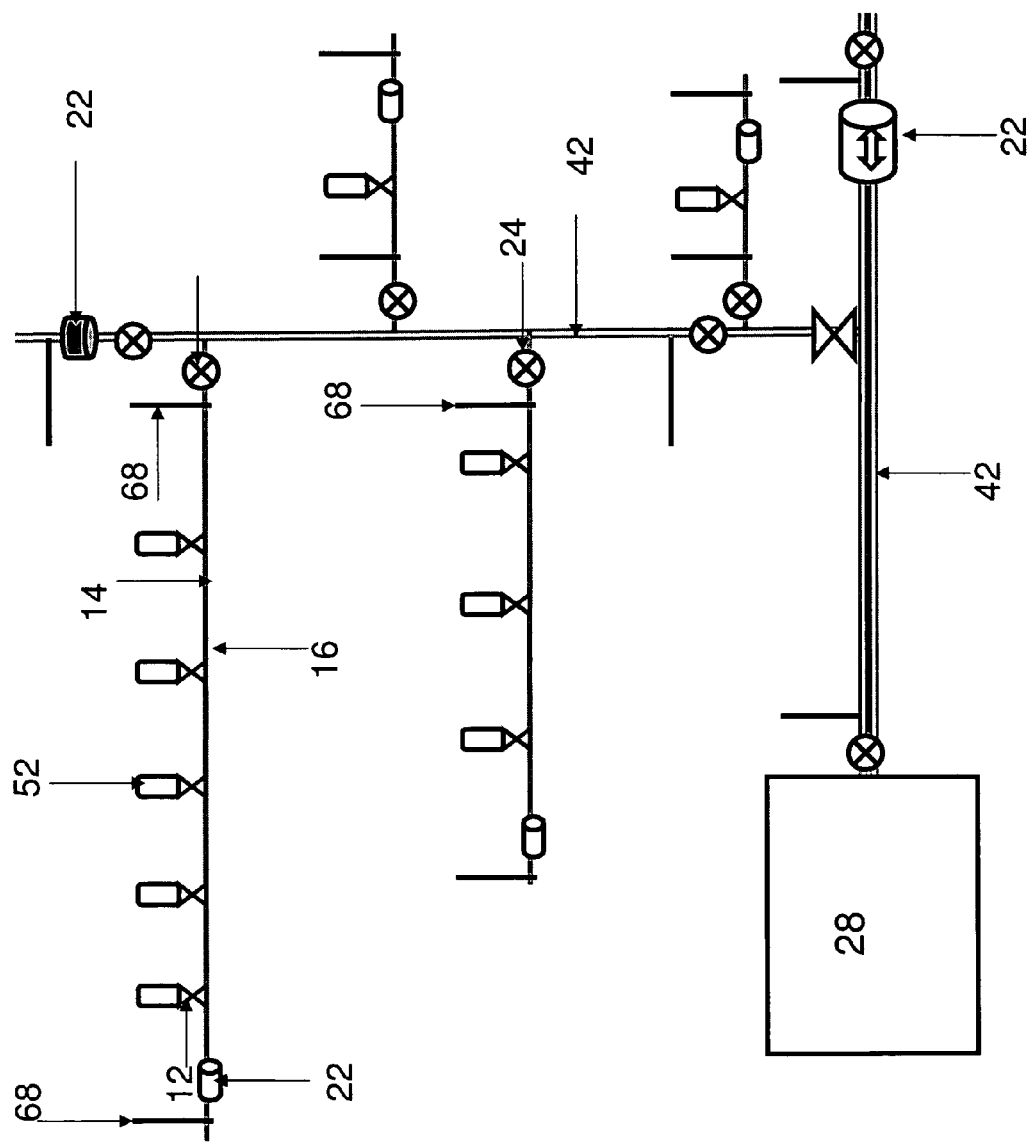
FIG. 5 shows a schematic diagram of a network extended into point of solid waste generation.

FIG. 5 shows the schematic view of at least one point of waste generation (52) for conveying solid waste (20) from the at least one point of waste generation (52) into at least one collection station (28) using at least one moving means (22). The method of conveying the solid waste (20) from the at least one point of waste generation (52) into the waste transport conduit (14) is similar to the embodiment described in FIGS. 1-1(e) and FIG. 2-2(c). The solid waste (20) from the waste transport conduit (14) is moved to at least one primary conveying zone (42) before being collected in the at least one collection station (28). The waste transport conduit (14) and the at least one primary conveying zone (42) include at least one zone valve (24) for controlling pressure conditions within at least one conveying zone (16) and movement of the solid waste (20) along the waste transport conduit (14) and controlling pressure conditions along the at least one primary conveying zone (42) and movement of the solid waste (20) in the at least one primary conveying zone (42) to the at least one collection station (28) respectively. The waste transport conduit (14) and the at least one primary conveying (42) zone includes at least one moving means (22) to move and push the solid waste (20) towards the at least one collection station (28). In this case, size of the waste transport conduits (14) and the at least one primary conveying zone (42) increase downstream in the direction of solid waste movement to cater for increasing solid waste (20) loads handled by the waste transport conduits (14) and the at least one primary conveying zone (42). The at least one moving means (22) is also dimensioned to operate effectively inside the respective waste transport conduit (14).

Figure 6:
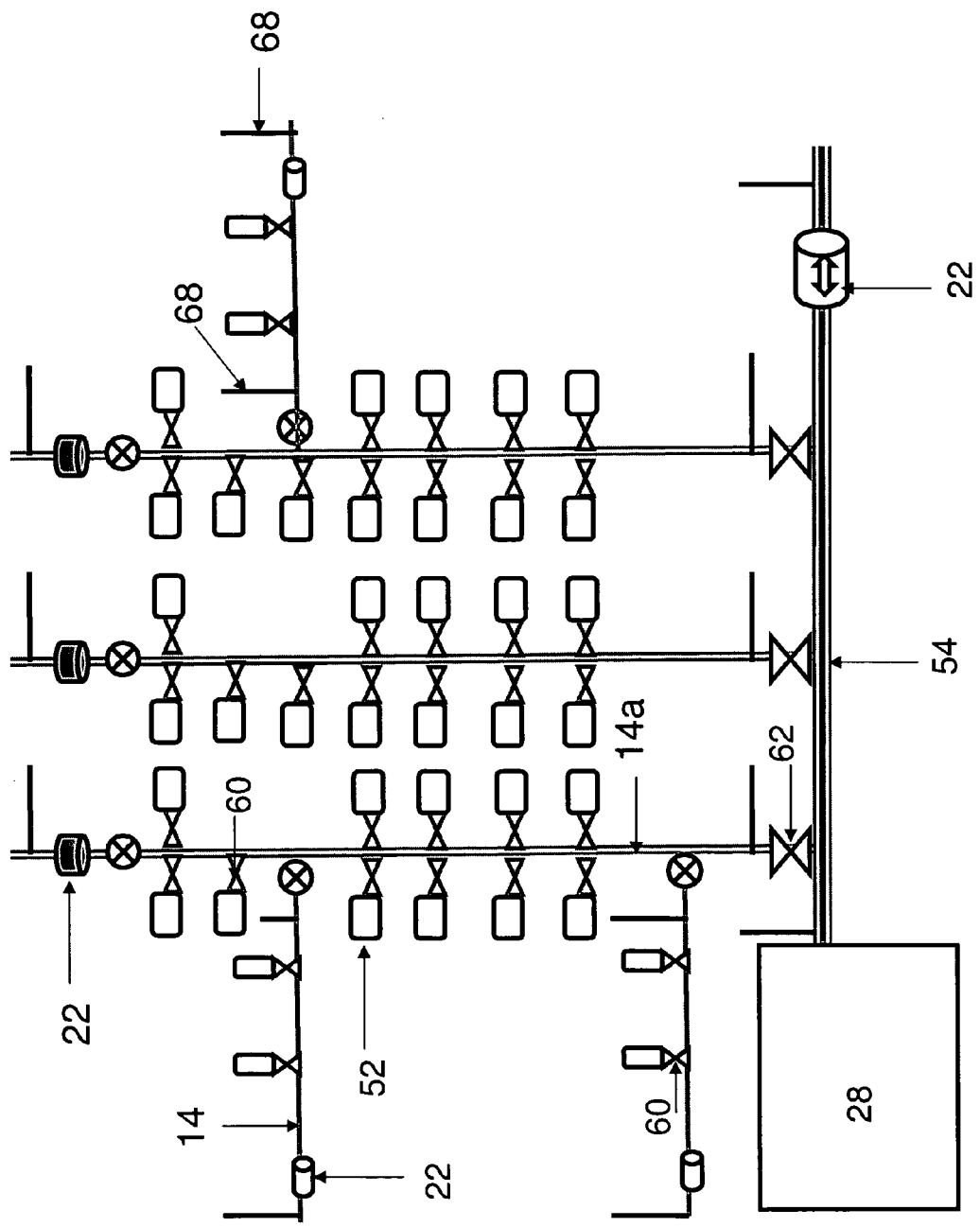
FIG. 6 shows a schematic diagram of a network extended into point of solid waste generation wherein the point of solid waste generation is arranged vertically to waste transport conduit.

FIG. 6 shows the schematic view of least one point of waste generation (52), for example, a kitchen, arranged vertically to a waste transport conduit (14a) for conveying solid waste (20) from the at least one point waste generation (52) into at least one collection (28) station using at least one moving means (22). The method of conveying the solid waste (20) from the at least one point of waste generation (52) into the waste transport conduit (14a) is similar to the embodiment described in FIGS. 1-1(e) and FIG. 2-2(c). The solid waste (20) from the waste transport conduit (14a) is moved to at least one primary conveying zone (54) before being collected in the at least one collection station (28). The at least one point of waste generation (52) is arranged vertically to the waste transport conduit (14a). The at least one point of waste (52) generation includes at least one means for regulating discharge (60) of the solid waste (20) from the at least one point of waste generation (52) to the waste transport conduit (14a). The solid waste (20) from the waste transport conduit (14a) is pushed and moved by at least one moving means (22) in the waste transport conduit (14a). The waste transport conduit (14a) includes at least one means for regulating discharge (62) of the solid waste (20) from the waste transport conduit (14a) to the at least one primary conveying zone (54). The waste transport conduit includes at least one zone valve (24) that allows for controlling differential pressure within the waste transport conduit (14a). The waste transport conduit as mentioned above (14a) can be connected to a plurality of waste transport conduit (14) mentioned in the system in page 10, line-18-30 and page 11 wherein the solid waste from the waste transport conduit (14) before being conveyed to the at least one collection station (28), it is moved to the waste transport conduit (14a). This scenario will be applicable for a larger solid waste conveying system which includes plurality of waste transport conduit (14).

Figure 7:
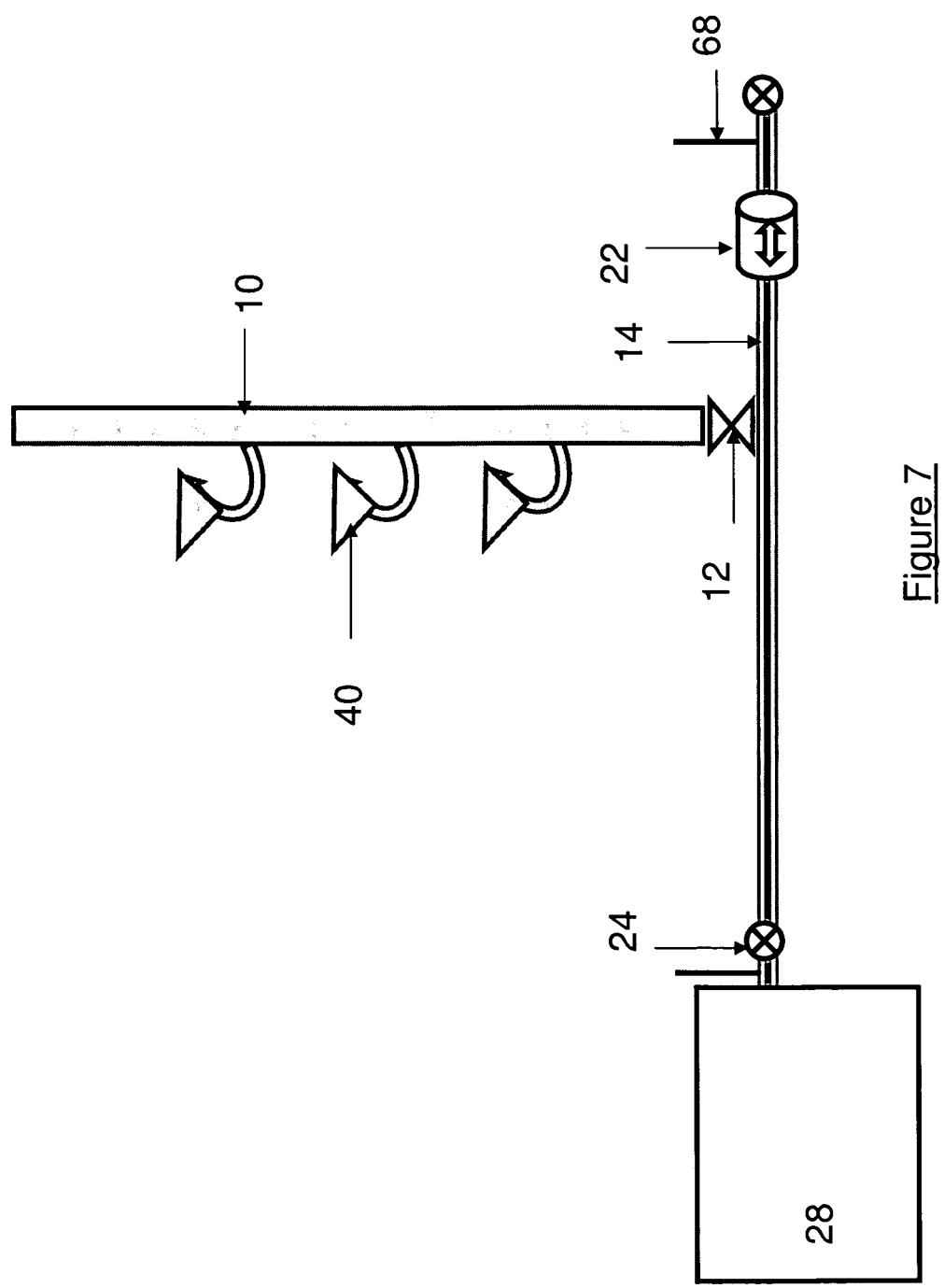
FIG. 7 shows a schematic diagram of a flushing water closet connected to the at least one holding area or to the point of solid waste generation.

FIG. 7 shows the schematic view of at least one holding area (10) or at least one point of waste generation (52), for example, a kitchen, which includes a flushing water closet (40) connected next to the at least one holding area (10) that flushes the solid waste (20) before it is conveyed to at least one collection station (28) or at least one collection conduit (26) through the waste transport conduit (14). The remaining portion of conveying the solid waste (20) from the at least one holding area (10) to the at least one collection station (28) or the at least one collection conduit (26) has been described above.

FIG. 8 shows a schematic view of conveying solid waste where at least two types of segregated solid waste (20a, 20b) from at least one holding area (10) can be moved concurrently along in respective waste transport conduits (14). Each waste transport conduit (14) has at least one means for regulating discharge (12) of the solid waste which controls type of solid waste (20a, 20b) that needs to be discharged to a waste transport conduit (14). The respective waste transport conduit (14) includes at least one moving means (22) that pushes and moves the solid waste (20a, 20b) discharged from the at least one holding area (10). The respective waste transport conduit (14) also includes at least one zone valve (24) which divides the waste transport conduit into at least one conveying zone (16). The at least one zone valve controls pressure conditions in the each conveying zone (16). The solid waste (20a, 20b) from the waste transport conduit is discharged to at least one primary conveying zone (42). In the primary conveying zone (42), there will be at least one moving means (22) that pushes and moves the solid waste (20a, 20b) to the at least one collection station (28a, 28b). The at least one collection station (28a, 28b) also comprises segregated waste containers or hoppers categorised into types of solid waste (20a, 20b) that is discharged from the at least one holding area (10). There is a control and sensor system that determines the type of solid waste (20a, 20b) that need to be discharged into the waste transport conduit (14) and a control system that determines which waste transport conduit (14) should discharge the type of solid waste (20a, 20b) to the at least one primary conveying zone (42) and to the respective collection station (28a, 28b). One of the at least two types of solid waste (20a,20b) in the at least two holding area is discharged to the waste transport conduit (14) which includes at least one moving means to push and move the solid waste to the at least one primary conveying zone (42). The discharge of the solid waste (20a, 20b) and movement of the at least one moving means (22) to move and push the solid waste and movement of the at least one moving means back to its starting position is described in the FIGS. 1-1(e) and FIG. 2-2(c). Similarly, the at least one primary conveying zone include at least one zone valve.

FIG. 9 shows a schematic view a rotating carousel (44) comprising at least two chambers (46) located above the means for regulating discharge (12) of the solid waste (12). The chambers (46) allow the at least one type solid waste (20a, 20b) that are thrown down through at least one holding area (10) to be segregated and conveyed separately through a waste transport conduit (14) to at least one collection station (28). This embodiment describes a system where selection of switches (64) for at least one type solid waste (20a, 20b) at the at least one holding area on various floors are interlocked with a carousel (44) for disposal of the at least one type solid waste (20a, 20b). The at least one type of solid waste (20a, 20b) at the at least one holding area (10) is selected to be thrown into the respective chamber (46) on the carousel (44). Once the selection of the at least one type of solid waste (20a, 20b) to be conveyed inside the waste transport conduit (14) has been done, the carousel (44) moves accordingly to the at least one type of solid waste (20a, 20b) either above the at least one moving means (22) as shown in FIG. 10 or below the at least one moving means (22) as shown in FIG. 9. Thereafter the at least one moving means (22) is used to move the at least one type of solid waste (20a, 20b) through at least one means for regulating discharge (12) of the at least one type solid waste to a waste transport conduit (14) where the at least one type solid waste (20a, 20b) will be moved from the waste transport conduit (14) to at least one collection station (28) or at least one collection conduit (26) by the at least one moving means (22) before it is subsequently returned to the original position above or below the carousel (44).

Advantages of the present invention is to reduce the initial investment in solid waste transport system, lower electrical power of equipment, allow the use variable diameter waste transport conduits, corrosion resistant conduits, minimize plant room space requirements, improve quality of transport air discharged to the environment, reduce electrical costs for operation of the system, reduce noise during the transport mode from both equipment and transport conduits, handle segregated material transport more efficiently, eliminate the need for use of plastic bags during the disposal process, allow for material to be transported in conduits without the current limitations of the furthest distance, reduce liquid content in waste before collection into a container, allow for easier direct feed to a transfer station, a waste segregation or a waste-to-energy plant and where a mobile system with retractable conduit is used to collect the solid waste thus increasing the overall efficiencies whilst reducing the disadvantages when compared to the existing systems.

As a conclusion, the present invention relates to a method and system for conveying solid waste (20) from the at least one holding area (10) to at least one collection station (28) by using at least one moving means (22). Movement of the at least one moving means to push and move the solid waste is created by generating differential pressure across the at least one moving means.

The invention claimed is:

1. A method for conveying solid waste from at least one holding area, the method comprising:
   (i) pneumatically discharging the solid waste from the at least one holding area to a plurality of waste transport conduits by creating differential pressure between the at least one holding area and the plurality of waste transport conduits;
   (ii) providing a pneumatic moving means having a moving member at an original position in each of the plurality of waste transport conduits;
   (iii) pushing and moving the solid waste in each of the plurality of waste transport conduits to at least one collection conduit or at least one collection station by pneumatically moving the moving member of the moving means wherein the pushing and moving of the solid waste is generated by creating differential pressure across the moving member of the moving means to push and move the solid waste towards at least one zone valve which is linked to at least one conveying zone that leads to the at least one collection station or the at least one collection conduit; and
   (iv) controlling the moving means so that the moving member is pneumatically returned to its original position wherein the moving member is returned to its original position by generating differential pressure across the moving member which creates movement of the moving member means from the at least one zone valve to its original position; and
      wherein the at least one zone valve is used to isolate the each of the plurality of waste transport conduits into at least one conveying zone to allow for each of the conveying zone to create a flow of air within the conveying zone to urge the moving member of the moving means to move and push the solid waste towards the at least one collection station or at least one collection conduit.

2. The method for conveying solid waste as claimed in claim 1, wherein the steps (i), (ii), (iii) and (iv) can occur simultaneously in each waste transport conduit.

3. The method for conveying solid waste as claimed in claim 1, wherein further comprising conveying the solid waste from the at least one conveying zone in step (iii) to at least one primary zone before being conveyed to the at least one collection station or the at least collection conduit.

4. The method for conveying solid waste as claimed in claim 1, wherein the plurality waste transport conduits and the at least one primary conveying zone comprise a range of conduit diameter sizes from 0.075 to 1.0 m.

5. The method for conveying solid waste as claimed in claim 1, further comprising controlling and monitoring wherein the differential pressure across the moving member is controlled and monitored by a control system to create movement of the moving member and which also indicates if there is an obstruction to movement of the moving member.

6. The method for conveying solid waste as claimed in claim 1, further comprising spraying wherein a liquid is on and around the solid waste to act as a lubricant before the moving member pushes the solid waste through the waste transport conduit.

7. The method for conveying solid waste as claimed in claim 1, further comprising collecting the solid waste from the at least one collection conduit by introducing a vehicle mounted transport conduit from a vehicle mounted container to a docking station which is connected to the at least one collection conduit.

8. The method for conveying solid waste as claimed in claim 7, further comprising moving the solid waste from the at least one collection conduit by the moving member by generating differential pressure across the moving member to move the moving member to push the solid waste from the at least one collection conduit to the vehicle mounted container via the docking station and vehicle mounted transport conduit.

9. The method for conveying solid waste as claimed in claim 8, further comprising controlling movement and pressure conditions of the solid waste from the at least one collection conduit to the vehicle mounted transport conduit by using at least one zone valve in the docking station.

10. The method for conveying solid waste as claimed in claim 8, further comprising uncoupling the vehicle mounted transport conduit once the solid waste is moved into the vehicle mounted container and the moving member moved back into the collection conduit.

11. The method for conveying solid waste as claimed in claim 1, further comprising flushing the solid waste in a flushing water closet whereby the flushing water closet is connected at a point where the solid waste is generated before being collected in the each holding area.

* * * * *

UNITED STATES PATENT AND TRADEMARK OFFICE
CERTIFICATE OF CORRECTION

| | | |
|---|---|---|
| PATENT NO. | : 9,126,754 B2 | Page 1 of 1 |
| APPLICATION NO. | : 13/132320 | |
| DATED | : September 8, 2015 | |
| INVENTOR(S) | : S. Ratnam | |

It is certified that error appears in the above-identified patent and that said Letters Patent is hereby corrected as shown below:

On the Title Page, in item (73), under "Assignee", in Column 1, Line 1, delete "PREMIUM PATENTS SND. BHD," and insert -- PREMIUM PATENTS SDN. BHD. --, therefor.

Signed and Sealed this
Twenty-third Day of August, 2016

Michelle K. Lee
*Director of the United States Patent and Trademark Office*